No. 637,758. Patented Nov. 28, 1899.
J. H. AYERS.
CENTRIFUGAL CREAM SEPARATOR.
(Application filed Feb. 20, 1899.)
(No Model.)
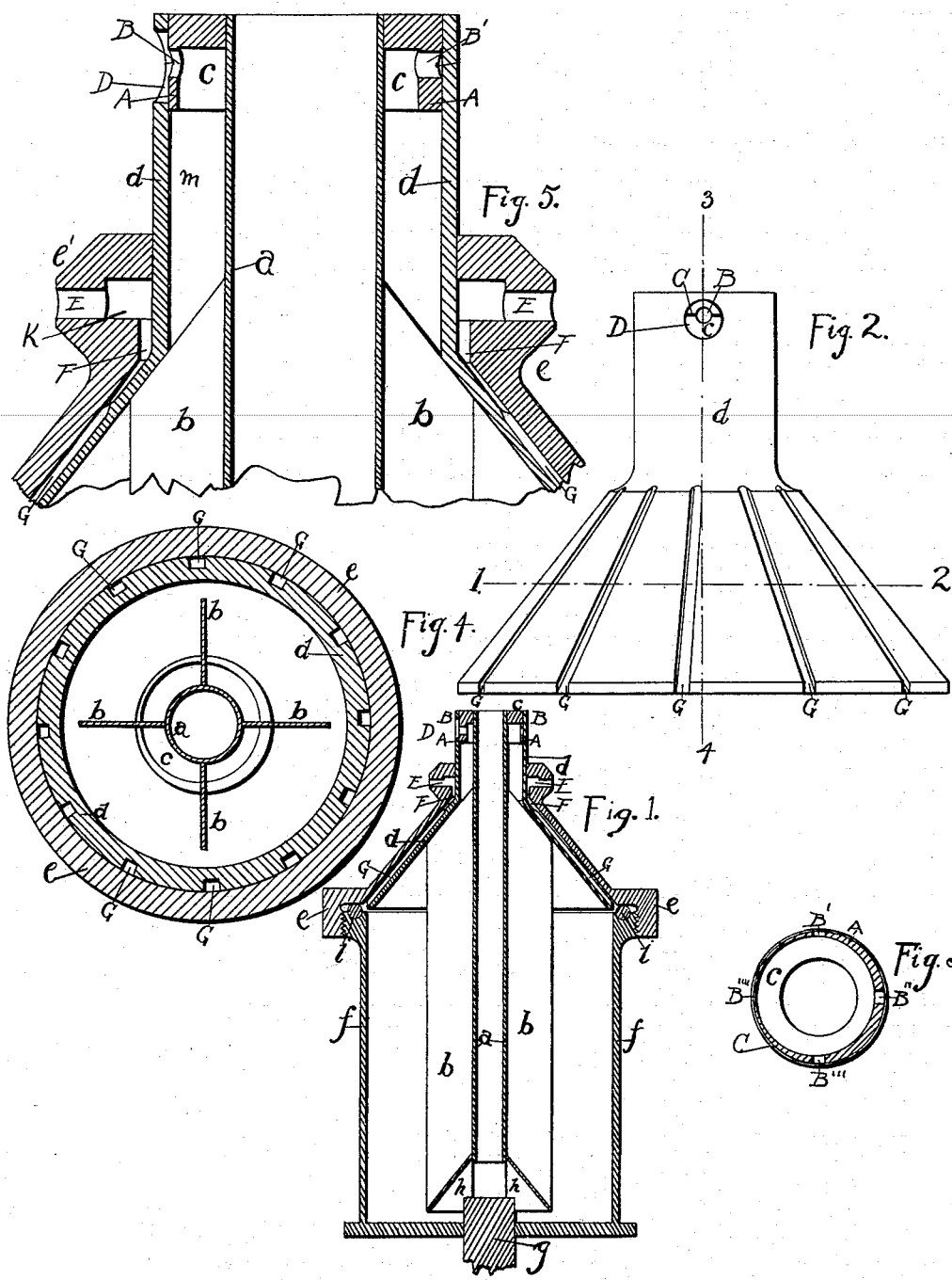
Witnesses.
Inventor.
John H. Ayers
per Clark C. Wood
Attorney.

UNITED STATES PATENT OFFICE.

JOHN H. AYERS, OF LANSING, MICHIGAN.

CENTRIFUGAL CREAM-SEPARATOR.

SPECIFICATION forming part of Letters Patent No. 637,758, dated November 28, 1899.

Application filed February 20, 1899. Serial No. 706,116. (No model.)

*To all whom it may concern:*

Be it known that I, JOHN H. AYERS, a citizen of the United States, residing at Lansing, in the county of Ingham and State of Michigan, have invented a new and useful Improvement in Separator-Bowls for Centrifugal Separators, of which the following is a specification.

My invention relates to the top or cover of the bowl, and is designed to make a device that will not be thrown out of balance by incorrect adjustment, that will be easily cleaned, and that will facilitate the rapid and efficient separation of the milk and cream and their egress from the bowl. I attain these objects by the mechanism illustrated in the accompanying drawings, in which—

Figure 1 is a vertical section of the bowl, showing all the parts in their proper relation to each other. Fig. 2 is a view of the internal cover, showing the milk-channels, neck, and cream ring and escape. Fig. 3 is a cross-section of the upper part of the neck of the inner cover, showing the construction of the cream-ring. Fig. 4 is a cross-section of the cover of the bowl along the line 1 2. Fig. 5 is an enlarged section of the top portion of the cover to exhibit the details of construction more clearly.

Similar letters refer to similar parts throughout the several views.

The bowl $f$ is of the ordinary construction, being cylindrical in shape. In the bottom is firmly fixed the driving-shaft $g$.

The cover of the bowl is conical in shape and is composed of two parts—an exterior $e$ and an interior $d$. The former is screwed firmly to the main body of the bowl, and the joint is made tight by rubber packing-rings, as $i$, or in any other suitable manner.

The interior cover $d$ is shown in Fig. 2. It conforms in shape to the inside of the exterior cover $e$ and in use is pressed closely against it by any suitable means, as shown in Figs. 1 and 4.

Skim-milk channels G are formed, preferably, in the exterior surface of the interior cover, communicating at one end with the groove, into which the rubber ring $i$ is placed, at a point just beyond the inner margin of the bowl $f$, as shown in Fig. 1, and at the other with the skim-milk passage F, thus forming, when the inner cover is in position, tubes through which the skim-milk passes from the peripheral portion of the bowl to the skim-milk groove K, from which it escapes at the skim-milk vents E.

At the top of the exterior cover is formed a solid ring of metal $e'$, in the inner face of which is cut a milk groove or reservoir K of considerable depth, out of which open the skim-milk vents E. The lower part of the ring $e'$ below the groove K is cut away, so as to form an annular passage F, connecting the milk-channels G with the groove K. The purpose of the groove K is to prevent leakage between the ring $e'$ and the neck of the interior cover, which it does in a manner more fully described hereinafter.

The cream-regulating ring A is fitted closely into the top of the neck of the interior cover $d$. The lower part of the interior wall of this ring is cut away, forming an eccentric recess or space $c$, through the walls of which are cut a number of cream-vents B, B', B'', B''', and B''''.

An opening D is made through the wall of the neck of the interior cover $d$, with which the cream-vents B B', &c., can be brought into line by revolving the cream-ring A. The space $c$ is arranged eccentrically with reference to the axis of the bowl in order to regulate the escape of cream from the bowl in a manner hereinafter more fully set forth.

The drawings show vanes $b$ attached to the central tube for the purpose of steadying the cream in the cream-pool; but these vanes form no part of my present invention.

In operation the full milk is admitted through the central tube $a$, which fits closely at the top into the central opening in the cream-ring A. Passing downward it escapes into the bowl at the bottom under the funnel-shaped expansion of the central tube $h$ into the main body of the bowl, where the cream and milk are separated. The skim-milk being heavier takes its place close to the periphery of the bowl, and the lighter cream at the center around the tube $a$. The skim-milk passes up to the top of the bowl and is thrown by the centrifugal force into the groove at the bottom of the interior cover $d$ and thence, as already stated, it passes through the channels G and the skim-milk space F into the skim-milk groove K, in which it flies at once to the exterior wall or periphery of the groove, it thus being unnecessary to have the joint between the upper part of the ring $e'$ and the neck of the interior cover entirely liquid-tight, since any escape of liquid at this point is prevented by the operation of the centrifugal force. The escape of cream between the cream-ring A and the tube $a$ is prevented in the same manner. The cream passes up along the central tube $a$ into the cream-space $m$ and gathers around the exterior walls of the chamber $c$, from which it escapes through the cream-vents B B', &c., and the opening D. The action of the centrifugal force effectually prevents any escape of cream between the central tube $a$ and the cream-ring A, and the joint between the cream-ring and the neck of the interior cover is made so close as to prevent any leakage of cream at that point.

The position of the cream-regulating ring, as shown in Fig. 5, is as it would be used for drawing thin cream. If it be desired to thicken the cream, the ring is revolved until one of the other cream-vents, as B', is brought opposite to the opening D. The wall A being thicker at this point brings the opening of the cream-vent B' closer to the center, and thus retards the escape of cream to some extent, and by this means, and by being nearest to the center where the cream is freest from milk, effects the desired result. A similar adjustment of the milk-escape may be made by the ordinary device of screw-plugs in the skim-milk vents E.

By constructing the exterior and interior covers in the manner indicated and placing them in complete contact with each other it is made possible to separate them for the process of cleaning with the greatest readiness and without any risk of throwing the device out of balance in replacing the parts. It is also found in practice that the channels G give very much more perfect results than either an uninterrupted space between the exterior and interior covers or a single tube, as used in other constructions, and the adjustable cream-ring A, with its eccentrically-arranged space $c$ and the cream-vents B B', &c., gives much better results than the ordinary device of an adjusting-screw.

I do not claim, broadly, the use of an exterior and interior separable cover to the bowl.

What I claim, and desire to secure by Letters Patent, is—

1. The combination in a bowl for centrifugal separators of separable exterior and interior conical covers having the conical surfaces in contact with each other and a plurality of channels formed between said covers, substantially as described.

2. In a bowl for centrifugal separators in combination with separable exterior and interior conical covers having the conical surfaces in contact with each other, the latter having a cylindrical neck, and a plurality of channels between the covers, of a groove surrounding the neck of the interior cover and an annular passage smaller in exterior diameter than said groove connecting the groove and channels.

3. In a bowl for centrifugal separators a cream-regulating ring having an eccentrically-arranged recess or cream-space.

4. In a bowl for centrifugal separators in combination with the exterior and interior covers to said bowl of a cream-regulating ring having an eccentrically-arranged recess and a plurality of radial openings into said recess, substantially as described.

5. A bowl for centrifugal separators having separable exterior and interior conical covers in contact with each other, channels between the covers, and a cream-ring having an eccentrically-disposed recess.

6. In a bowl for centrifugal separators in combination, an interior conical cover, having channels in its exterior surface and a cylindrical neck, and a cream-ring having an eccentrically-disposed recess located in said neck.

JOHN H. AYERS.

Witnesses:
C. C. WOOD,
ETTA H. GARDINE.